(12) United States Patent
Ooba

(10) Patent No.: US 9,776,808 B1
(45) Date of Patent: Oct. 3, 2017

(54) ARTICLE TRANSFER APPARATUS

(71) Applicant: Fanuc Corporation, Yamanashi (JP)

(72) Inventor: Masafumi Ooba, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 15/584,203

(22) Filed: May 2, 2017

(30) Foreign Application Priority Data

May 19, 2016 (JP) .................. 2016-100317

(51) Int. Cl.
*B65G 47/24* (2006.01)
*B65G 47/26* (2006.01)
*G05B 19/418* (2006.01)

(52) U.S. Cl.
CPC ......... *B65G 47/268* (2013.01); *G05B 19/418* (2013.01)

(58) Field of Classification Search
CPC ........................... B65G 47/268; G05B 19/418
USPC ......... 198/394, 395, 401; 700/214, 230, 247
See application file for complete search history.

(56) References Cited

U.S. PATENT DOCUMENTS

| | | | | |
|---|---|---|---|---|
| 5,040,056 A * | 8/1991 | Sager | ..................... | B25J 9/0093 348/88 |
| 5,314,055 A * | 5/1994 | Gordon | .................. | B25J 9/1697 198/395 |
| 5,370,216 A * | 12/1994 | Tsuruyama | ............ | B25J 9/1697 198/376 |
| 6,315,103 B1 * | 11/2001 | Boucherie | .............. | A46D 3/085 198/395 |
| 6,374,984 B1 * | 4/2002 | Nagler | ..................... | B07C 5/361 177/1 |
| 6,779,647 B1 * | 8/2004 | Nagler | ............... | A22C 17/0093 198/395 |
| 8,014,899 B2 * | 9/2011 | Ban | ........................ | B25J 9/0093 198/340 |
| 8,386,069 B2 * | 2/2013 | Hartmann | .......... | G05B 19/4103 318/34 |
| 8,805,585 B2 * | 8/2014 | Nishihara | .............. | B25J 9/0093 198/339.1 |
| 8,843,232 B2 * | 9/2014 | Hartmann | .......... | G05B 19/4182 700/230 |
| 9,221,617 B2 * | 12/2015 | Waller | .................... | B65G 23/44 |
| 9,643,796 B2 * | 5/2017 | Koga | .................... | B65G 47/905 |
| 2006/0057239 A1 | 3/2006 | Hariki et al. | | |

(Continued)

FOREIGN PATENT DOCUMENTS

| JP | 3876260 B2 | 1/2007 |
|---|---|---|
| JP | 2007030087 A | 2/2007 |
| JP | 4226623 B2 | 2/2009 |

*Primary Examiner* — Douglas Hess
(74) *Attorney, Agent, or Firm* — Winstead PC

(57) ABSTRACT

This article transfer apparatus comprises a disk member, an article supply apparatus which changes at least positions of the respective articles at a predetermined circumferential position of the rotating disk member, a rotation sensor which detects a rotational position of the disk member, a visual sensor which obtains information for identifying at least positions of the respective articles on the disk member, and a robot which picks up the articles on the disk member in a state in which the disk member is rotating, by using an article position information in which the information obtained by the visual sensor corresponds to a detected result of the rotation sensor at the time of obtaining the information, and a detected result of the rotation sensor at the time of picking up the articles.

4 Claims, 8 Drawing Sheets

(56) References Cited

U.S. PATENT DOCUMENTS

2007/0179671 A1 8/2007 Arimatsu et al.
2008/0082213 A1 4/2008 Ban et al.

* cited by examiner

ARTICLE TRANSFER APPARATUS

CROSS-REFERENCE TO RELATED APPLICATIONS

This application is based on Japanese Patent Application No. 2016-100317 filed on May 19, 2016, the content of which is incorporated herein by reference.

TECHNICAL FIELD

The present invention relates to an article transfer apparatus which picks up articles from an article group in order to transfer them to a predetermined transferred position.

As this kind of article transfer apparatus, an article transfer apparatus which measures exact positions of a plurality of articles housed in a box by a three-dimensional position-measuring apparatus and which picks up the articles in the box one by one by a robot arm according to the measurement result is known. (See PTL 1, for example.)

As another example of the article transfer apparatus, an article transfer apparatus having a plurality of robot arms located along a conveyer in order to pick up the plurality of articles transferred by the conveyer, wherein the robot arms includes robot arms located at the downstream side to pick up the articles which are not picked up by robot arms located at the upstream side, is known. (See PTL 2, for example.)

As another example of the article transfer apparatus, there is a known article transfer apparatus which comprises a rotating table, an article housing unit which is placed above a substantially circumferential half-area of the rotating table, a sensor which is provided above the other circumferential half-area of the rotating table and which detects positions of the articles on the rotating table, and a robot arm which picks up the articles on the other circumferential half-area of the rotating table one by one by using the detected result of the sensor, wherein a bottom surface of the article housing unit is consist of the rotating table and a gap through which the articles can pass is formed between a side surface of the article housing unit and the rotating table so that the articles in the article housing unit are gradually released to the other half-area of the rotating table. (See PLT 3, for example.)

CITATION LIST

Patent Literature

{PTL 1} Japanese Patent No. 4226623
{PTL 2} Japanese Unexamined Patent Application, Publication No. 2007-30087
{PTL 3} Japanese Patent No. 3876260

SUMMARY OF INVENTION

An article transfer apparatus according to a first aspect of the present invention comprises a circulation conveyer which rotates along a predetermined circular-arc track in a state in which a plurality of articles are placed thereon; an article position change apparatus or member which changes at least positions of the respective articles on the circulation conveyer at a predetermined circumferential position of the rotating circulation conveyer; a rotational position detecting device which detects a rotational position of the circulation conveyer; a sensor which obtains information that enables identification of at least positions of the respective articles on the circulation conveyer at a position after passing through the predetermined position in the circumferential direction; and an article pick up device which picks up the articles placed on the circulation conveyer in a state in which the circulation conveyer is rotating and which transfers the picked-up articles to a predetermined transferred position by using article position information in which the information obtained by the sensor corresponds to a detected result of the rotational position detecting device at the time of obtaining the information by the sensor, and a detected result of the rotational position detecting device at the time of picking up the articles.

DESCRIPTION OF EMBODIMENTS

An article transfer apparatus in accordance with a first embodiment of the present invention is described below with reference to the drawings.

Figure 1:
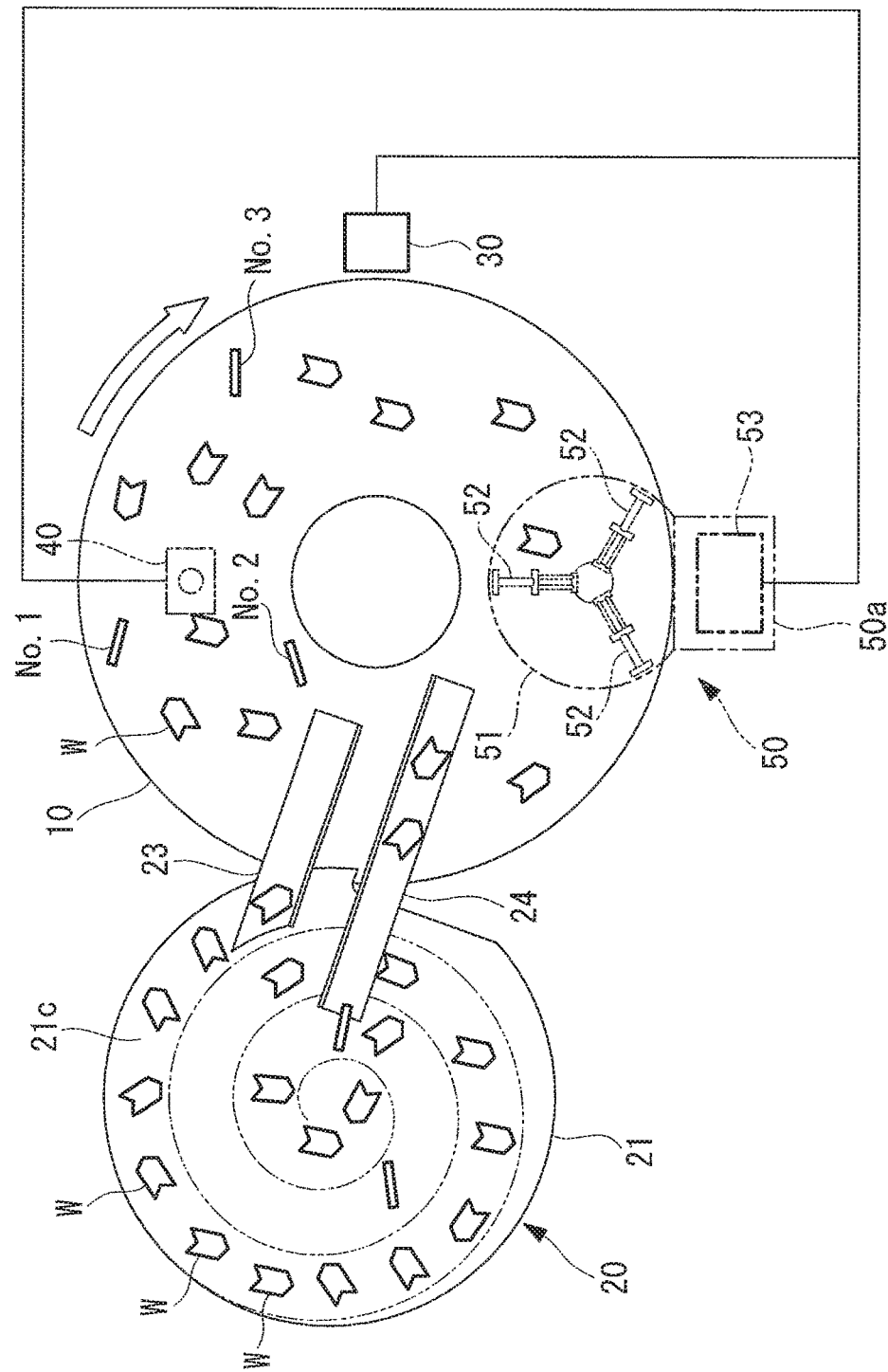
FIG. 1 is a plan view showing a schematic configuration of an article transfer apparatus according to a first embodiment of the present invention.

As shown in FIG. 1, this article transfer apparatus comprises a disk member 10, as a circulation conveyer, which has a circular plate shape and which rotates at a state where a plurality of articles W are placed thereon, an article supply apparatus 20, as an article position change means, which collects the articles W on the disk member 10 and which newly supplies articles W to the disk member 10 at a predetermined position in a circumferential direction of the rotating disk member 10, a rotation sensor 30, as a rotational position detecting means, which detects a rotational position of the disk member 10, a visual sensor 40 which obtains information to identify a position and posture of each of the articles W on the disk member 10 at a position which is at a downstream side relative to a supply position of the articles W by the article supply apparatus 20, and a robot 50, as an article pick up means, which picks up the articles on the disk member 10 while the disk member 10 is rotating and which transfers the picked up articles W to a predetermined transferred position, the picking up is conducted at a position which is at a downstream side relative to the position for conducting the detection by the visual sensors 40.

Figure 2:
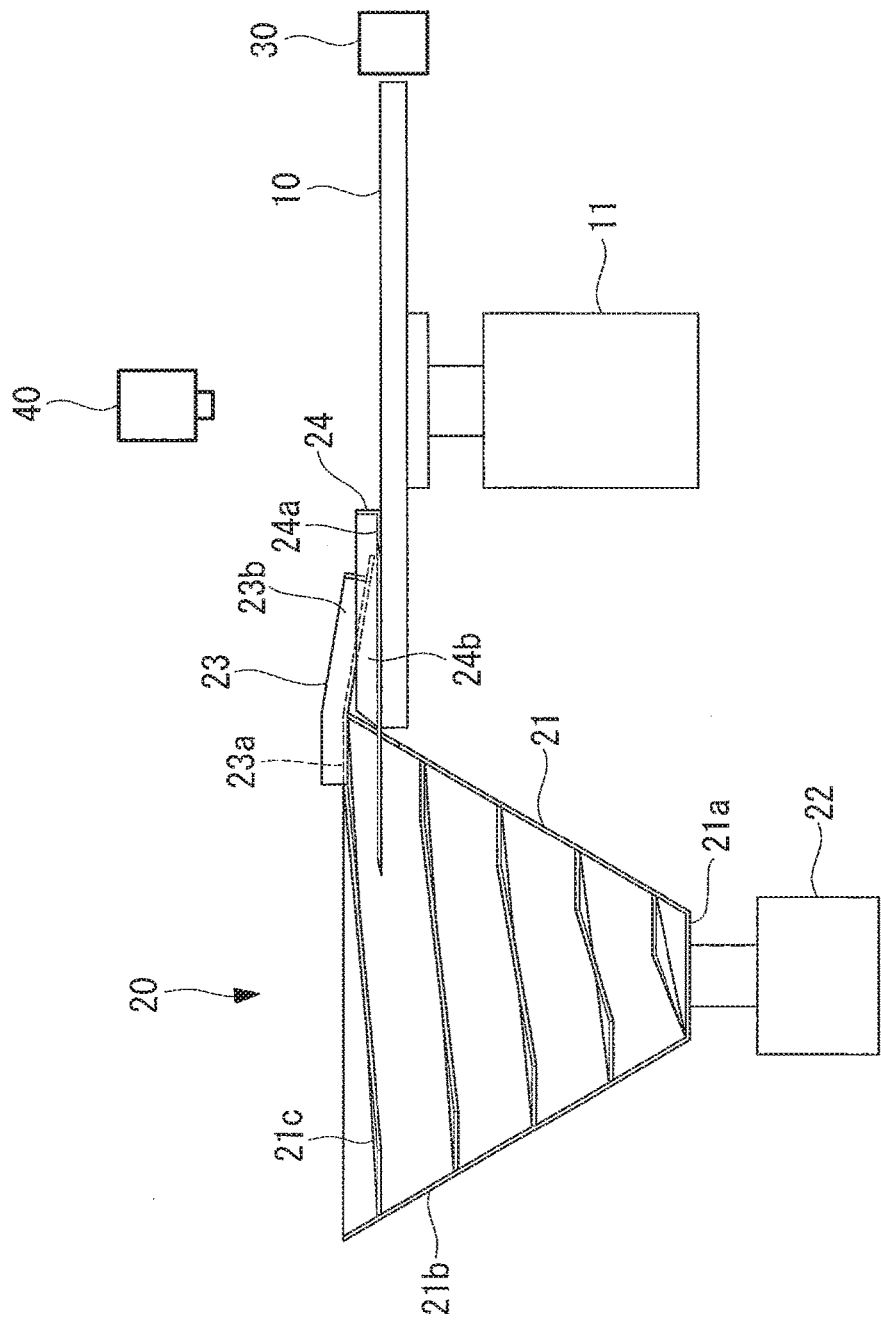
FIG. 2 is a partial sectional side view showing a schematic configuration of the article transfer apparatus according to the first embodiment.

As shown in FIG. 2, the disk member 10 is configured to rotate in a clockwise direction, as shown in FIG. 1, by a driving device 11 such as a servo motor or the like, and the driving device 11 is controlled by a below-mentioned robot controller 53. That is to say, the robot controller 53 controls the driving device 11 so that the disk member 10 can rotate at an arbitrary rotation speed.

The article supply apparatus 20 can use a known parts feeder. In this embodiment, the article supply apparatus 20 includes a container 21 which has a substantially circular shape in a plan view for housing the articles, and the container 21 comprises a bottom surface 21a, side faces 21b, and article feeding passages 21c which are placed spirally in the side faces 21b.

As shown in FIG. 2, the article supply apparatus has a vibration imparting device 22 provided with an electromagnet and a plate spring, for imparting vibration to the container 21, an article feeding member 23 which feeds the articles W, which have reached the upper end of the article feeding passage 21c, to the disk member 10, and an article collecting member 24 which collects the articles W on the disk member 10 and drops the articles W to a middle side of the container 21. The vibration imparting device 22 is controlled by the below-mentioned robot controller 53.

The article feeding member 23 is placed above the disk member 10 so as to extend substantially in a radial direction of the disk member 10. One end of the article feeding member 23 is placed outside in the radial direction of the disk member 10, and is also placed at a position where the articles W are fed from the article feeding passage 21c, and the other end of the article feeding member 23 is placed inside in the radial direction of the disk member 10. The article feeding member 23 is formed by an L-shaped cross-section member, and comprises a bottom surface portion 23a which extends in a substantially horizontal direction, and side wall portion 23b which extends upwardly from one end of the width direction of the bottom surface portion 23a across the entire longitudinal direction of the bottom surface portion 23a. The one end of the bottom surface portion 23a in the width direction is placed at a position which is at an upstream side of the rotation direction of the disk member 10 than the other side thereof.

The article collecting member 24 is placed above the disk member 10 so as to extend substantially in a radial direction of the disk member 10. One end of the article collecting member 24 is placed outside in the radial direction of the disk member 10, and is placed within the container 21, and the other end of the article collecting member 24 is placed inside in the radial direction of the disk member 10. The article collecting member 24 is formed by an L-shaped cross-section member, and comprises a bottom surface portion 24a which extends in a substantially a horizontal direction, and side wall portion 24b which extends upwardly from one end of the width direction of the bottom surface portion 24a across the entire longitudinal direction of the bottom surface portion 24a. The bottom surface portion 24a is in contact with the upper surface of the disk member 10, or placed adjacent to the upper surface of the disk member 10. The one end of the bottom surface portion 24a in the width direction is placed at a position which is at a downstream side of the rotation direction of the disk member 10 than the other side thereof.

With such configured article supply apparatus 20, when the container 21 is vibrated by the vibration imparting device 22, due to this vibration, the articles W in the container 21 are moved on the article feeding passage 21c toward the upper end side thereof. And, the articles W are moved to the article feeding member 23 from the upper end side of the article feeding passage 21c, and are dropped to the upper surface of the disk member 10 from the article feeding member 23. At this time, it is preferable that an inclination and a dimension of the article feeding member 23 should be set so that the articles W can be dropped to various positions of the disk member 10 in the radial direction.

On the other hand, since the bottom surface portion 24a of the article collecting member 24 is in contact with the upper surface of the disk member 10, or, it is placed adjacent to the upper surface of the disk member 10, the articles W on the disk member 10 will be placed on the bottom surface 23a of the article collecting member 24 by the rotation of the disk member 10, and the transfer of the articles W toward the downstream side of the disk member 10 in the rotation direction will be limited by the side wall portions 24b of the article collecting member 24. Due to this, the articles W on the bottom surface portion 24a are pushed toward the side of the container 21 by the articles W which are placed on the bottom surface portion 24a one after the other, and therefore, the articles on the disk member 10 are housed in the container 21. Note that the article collecting member 24 can be configured from the following elements: a plate-like member which is placed near the upper surface of the disk member 10 so as to extend in a radial direction of the disk member 10, which prevents the articles W from moving by the rotation of the disk member 10, and which is configured so that the articles W which have been previously prevented from being moved can be transferred outside in the radial direction of the disk member 10 by the articles W which are prevented from being moved one after the other; and a receiving member which receives the articles W dropped from the outer circumference portion of the disk member 10 by a plate-like member, and which returns the articles to the container 21.

The rotation sensor, for example, can use a known encoder which applies light to a code wheel that is fixed to the outer circumferential surface of the disk member 10, and which detects the rotational position of the disk member 10 by receiving the reflected light. A sensor which detects a rotational position of an axis of the servo motor, which is the driving device 11, can be provided as the rotation sensor 30. Also, a rotation frequency can be detected by providing a roller on a tip of a rotation axis of a pulse coder in order to push the roller against the outer circumferential surface of the disk member 10, and by allowing the roller to rotate together with the disk member 10. Or, the rotational position of the disk member 10 may be detected by connecting the driving device 11 and the pulse coder by a belt so that the rotation axis of the driving device 11 and that of the pulse coder can operate together, or by engaging gears thereof with each other.

The robot 50 has a robot body 51 which is supported by a frame 50a, three robot arms 52 which are supported by the robot body 51, and the robot controller 53 which controls the robot arms 52.

Figure 3:
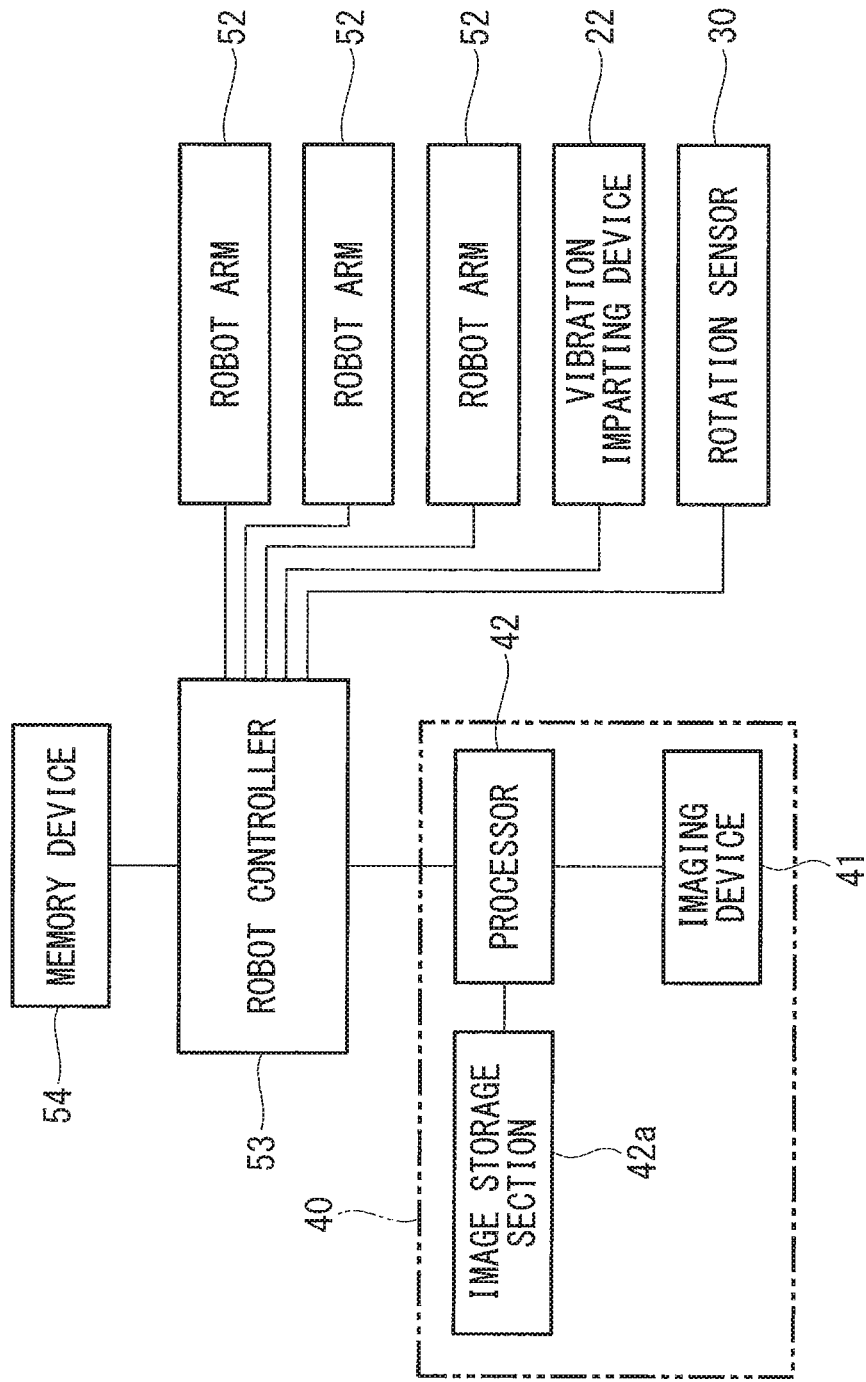
FIG. 3 is a schematic block diagram of the article transfer apparatus according to the first embodiment.

As shown in FIG. 3, the visual sensor 40 has a two-dimensional imaging device 41 which captures images of the plurality of articles W on the disk member 10, and a processor 42. The images captured by the imaging device 41 are image-processed by the processor 42, and information on the basis of the processed image is sent to the robot controller 53 which is placed in the robot 50, and the robot controller 53 stores the information on the basis of the received processed image in a memory device 54.

The processor 42 performs known image processing such as static thresholding process, dynamic thresholding process, or the like on the captured images, and stores the processed images in the image storage section 42a. The processor 42 is a computer which has a CPU and a memory, and performs the image processing on the basis of a certain program stored in the memory. The processor 42 may send the processed images as information on the basis of the processed images to the robot controller 53, or it may send location information of feature points (portions having distinctive shapes) of the plurality of articles shown in each of the processed images as information on the basis of the processed images to the robot controller 53. In any of the cases, the information on the basis of the processed images is information for identifying a position and posture of each of the articles W.

The robot controller 53 operates on the basis of a program stored in the memory device 54, and according to the information based on the processed images, the robot controller 53 discriminates articles which are located at positions capable of being picked up by the robot arms, and each of which has posture capable of being picked up by the robot arms. Also, the robot controller 53 controls the plurality of servo motors for moving the robot arms on the basis of this detected result, the information based on the processed images, reference posture information of article stored in the memory device 54, and the detected result of the rotation sensor 30 during pick-up operation. By this, the articles W are picked up one by one by the respective robot arms, and the picked up articles are transferred to a predetermined transferred position. Here, a plurality of grip parts can be provided to the rip of the robot arms 52, and in this case, a plurality of the articles W are picked up at one time or continuously by the robot arms from the disk member 10, and the plurality of the received articles W are transferred to the predetermined transferred position.

Also, in this embodiment, the robot controller 53 is configured to operate based on the program so as to send control signals to the driving device 11, the vibration imparting device 22, the rotation sensor 30, and the visual sensor 40, and thereby controls these devices and the respective robot arms 52. Also, the robot controller 53 is configured to receive the detected result of the rotation sensor 30.

Figure 4:
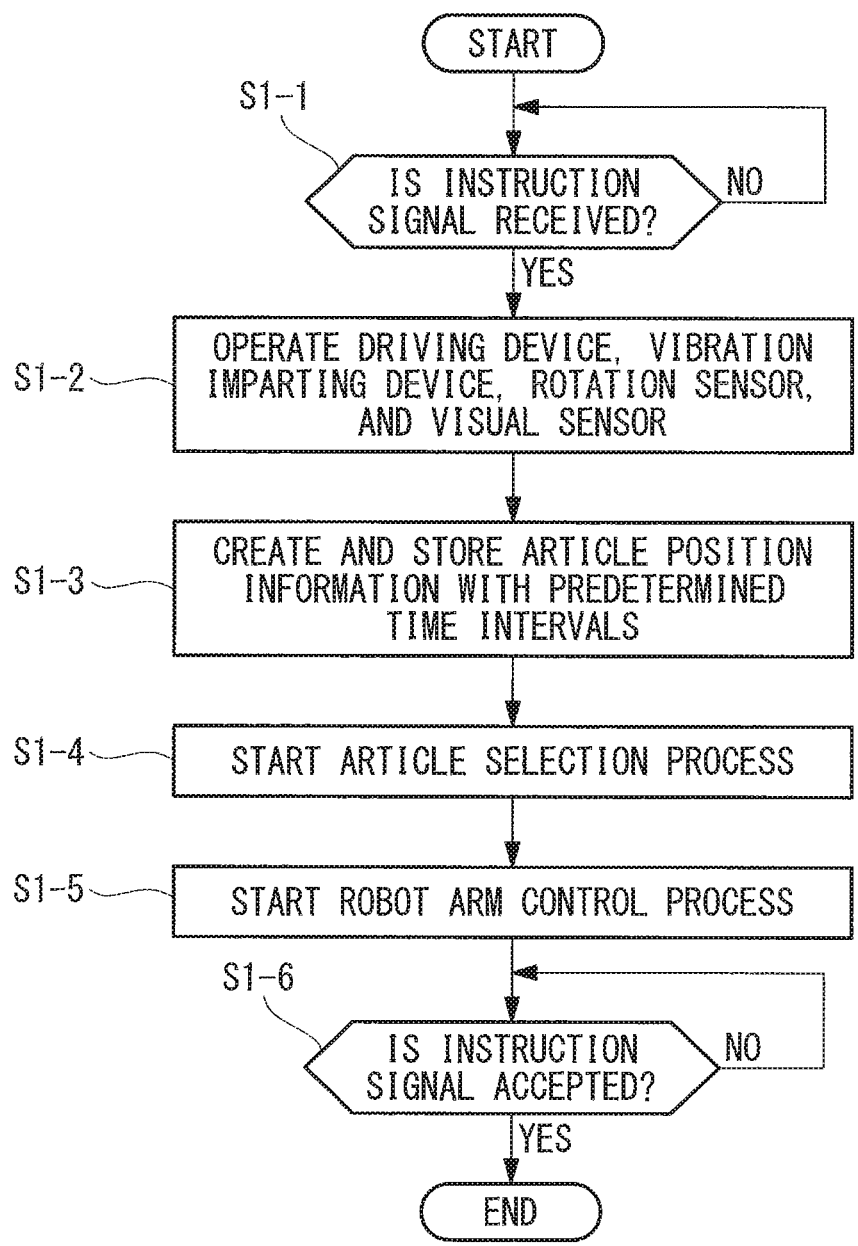
FIG. 4 is a flow chart showing control by a robot controller of the article transfer apparatus according to the first embodiment.

One example of the operation of the robot controller 53 is explained below with reference to a flowchart shown in FIG. 4. In this example, processed images are used as the information based on the processed images.

First, when an operator inputs, by a predetermined input device, an instruction for starting the transfer of the articles W by the robot 50, and once the instruction is received by the robot controller 53 (step S1-1), the driving device 11, the vibration imparting device 22, the rotation sensor 30, and the visual sensor 40 are started to operate (step S1-2). By this, the articles W are supplied to the rotating disk member 10 from the article supplying apparatus 20.

Next, by the visual sensor, images of the articles W on the disk member 10 are captured with predetermined time intervals, or images of the articles W on the disk member 10 are captured every time the articles W move for a predetermined distance, and the robot controller receives the processed images from the processor 42, and store information which corresponds to the detected result of the rotation sensor 30 at the time of image capturing in the memory device 54 (step S1-3). The information which corresponds the processed images stored in the memory device 54 and the detected result of the rotation sensor 30 is referred to as article position information. And, with respect to each of the processed images of each article position information stored with the predetermined time intervals or every time the articles W move for the predetermined distance, an article selection process which selects the articles at positions which are located on the disk member 10 and which are capable of being picked up by the robot arms 52 is started (step S1-4). At this time, the articles which match with the reference posture are selected prior to the other articles. For example, the processed images show thin images of the articles W when the articles W are in standing posture on the disk member 10 like the articles No. 1 to No. 3 that are shown in FIG. 1.

Also, like the other articles W shown in FIG. 1, even when the articles W are lying on the disk member 10, the articles W face various directions, which can be seen in the processed images. In such cases, in the processed images of the article position information, when an article W is in posture which is between reference posture P1 and reference posture P2 shown in FIG. 5, such article W can be determined to match the predetermined reference posture. Together with the posture, it is also possible to determine whether the articles match a reference shape.

Figure 5:
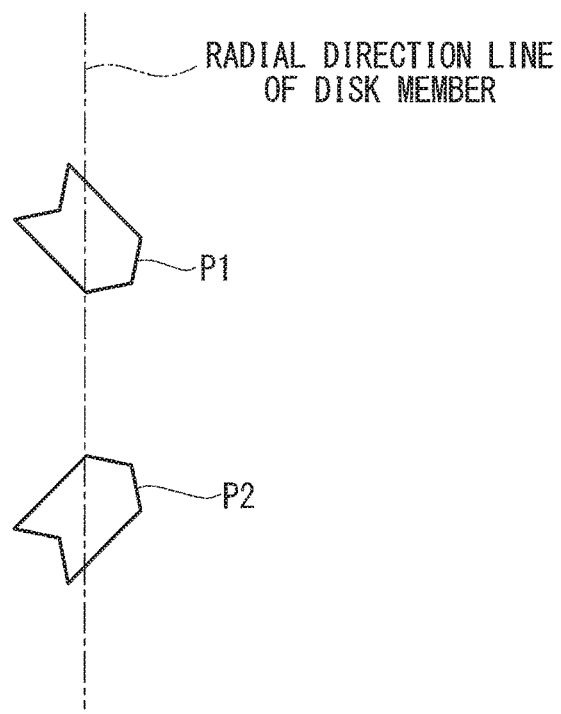
FIG. 5 is a view showing an example of a reference posture data of the article transfer apparatus according to the first embodiment.

Yet, it is not the case that the determination whether the article match the reference posture is made only when comparing the article with the reference posture which is shown in FIG. 5. For example, at a detecting phase which detects whether the articles W are shown in processed images, and a position of the articles W when they are shown, when a fine or complex detection processing is conducted, the articles like the standing articles No. 1 to No. 3 can be detected as the article W, however, when a rough or simple detection processing is conducted, articles in the standing posture like the articles No. 1 to No. 3 cannot be detected as the article W. Also, with the laying articles, articles W which are being overlapped with each other, which are inclined, which are not facing intended directions, and the like may not be detected as the articles W. Therefore, conduct the detection of whether the articles W are shown in the processed images and of their positions if they are shown under a rough or simple predetermined condition, regard articles which are detected to be the articles W under such condition as the articles which match the reference posture and conduct processing on such articles. When selecting articles W which face an intended direction by using other method, such articles are detected as being matched with the predetermined reference posture.

Further, depending on kinds of the articles W, in the processed images of the article position information, it is possible to detect whether the articles W are laying with their face side up or their back side up, and in such case, it is possible to configure to preferentially select the articles W laying with their face side up.

In addition, with the processed images of the article position information, when more than two articles W approach with each other within a predetermined distance, or come into contact with each other, an assured pick-up by the robot arms 52 may be prevented, therefore, the articles W except for such articles are determined that they are at positions capable of being picked up.

Next, a robot arm control process which controls the plurality of servo motors respectively for operating the robot arms 52 is started based on the selection result of step S1-4, the processed images of the article position information, and the detected result of the rotation sensor 30 when conducting the pick-up operation which is to conduct an actual pick-up operation by the robot arms 52 (step S1-5). By this, at a state where the disk member 10 is rotating, the articles W are picked up one by one from the disk member 10 by the robot arms 52, and the picked-up articles W are transferred to the predetermined transferred position.

At this time, due to the rotation of the disk member 10, the articles W on the disk member 10 are transferred to the under part of the robot 50 from the lower part of the visual sensor 40, however, the articles W are not moved relative to the disk member 10. Due to this, the robot controller 53 can know a position and posture of each of the articles W on the disk member 10 based on the processed images of the article positon information and the detected result of the rotation sensor 30. Thus, in step S1-5, the articles W on the disk member 10 can be picked up one by one by the robot arms 52 in a state where the disk member 10 is rotating. Note that, since the processed images are created with predetermined time intervals, or every time the articles W move for a predetermined distance, and the article position information in which the processed images correspond the current detected result of the rotation sensor 30 is created, the robot controller 53 use the processed images of the article position information which correspond with positions for conducting the pick-up operation by the robot arms.

In step S1-5, it is possible to configure the article transfer apparatus to pick up the articles W selected in step S1-4, which are determined to be at a position capable of being picked up, and to match the reference posture. By this, the pick-up efficiency of the robot arms 52 can be much improved.

Also, it is also possible to control the robot arms 52 by the robot controller 53, so that the robot arms 52 can pick up the articles W, which allows a moving distance of the robot arms 52 to be short, prior to the other articles.

Then, for example, when an operator inputs, by a predetermined input device, an instruction for ending the transfer of the articles W by the robot 50, and once the instruction is received by the robot controller 53 (step S1-6), the robot controller 53 ends the processing.

While the robot controller 53 is conducting the above process, the articles W which are not picked up by the robot arms 52 are housed in the container 21, and the articles W housed in the container 21 is fed to the disk member 10 by the article feeding member 23.

Also, in this embodiment, when a sufficient amount of the articles W is housed in the article supply apparatus 20, the article supply apparatus 20 is configured so that it can supply, to the disk member 10, articles W more than the amount being picked up by the robot arms 52. That is, some of the articles W supplied to the disk member 10 by the article supply apparatus 20 are collected by the article collecting member 24 without being picked up by the robot arms. With this configuration, since an absolute amount of the articles W on the disk member 10, which are easy to be picked up by the robot arms 52, is increased, it is advantageous for shortening a time period required for picking up operation of the articles W.

Like this, in this embodiment, since the plurality of the articles W are placed on the disk member 10, and positions of the articles W can be changed at the predetermined position in the circumferential direction, the information for detecting the positions of the articles W after their positions are changed is obtained by the visual sensor 40, and the articles W on the disk member 10 are picked up by the robot arms 52 by using the information, every article W will be placed at its suitable position for being picked up by the robot arms after repeatedly rotating the disk member 10 and changing positions of the articles W.

Thus, due to the disk member 10, it is not required to pick up every article W which is sent to the pick-up range of the robot arms, and the articles can be picked up sequentially from the articles which are easy to be picked up. Also, the articles W which are moved to the downstream side without being picked up will be picked up after changing the position and posture of each of the articles W by the article supply apparatus 20. Therefore, it is unnecessary to provide other robot arms 52 in order to pick up the articles W which are moved to the downstream side without being picked up.

Moreover, since the articles W can be picked up sequentially from the articles which are easy to be picked up, it is unnecessary to provide a complex structure to the robot arms in order to pick up the articles W with bad pick-up conditions. And, it is also unnecessary to obtain exact location information, or the like of the respective articles W by the visual sensor 40 in order to pick up the articles W with the bad pick-up conditions by the robot arms with the complex structure, which can also reduce costs required for the visual sensor 40.

In addition, when the articles W are not picked up by the robot arms 52 because of the articles W which are placed at positions that are too difficult for the robot arms to pick up, the positions of the articles W are changed by the article supply apparatus 20, and the information that enables identification of the positions of the articles W is obtained by the visual sensor 40, and the robot arms 52 pick up the articles W on the disk member 10 by using the information, therefore, it is unnecessary to pick up the articles W with bad pick-up conditions.

Furthermore, the robot arms 52 are controlled by the robot controller 53 so as to select the articles W to be picked up by the robot arms 52 on the basis of the article position information, and to pick up the selected articles W. Thus, the operation for picking up the articles W with bad conditions can be reduced or eliminated.

In addition, with the selection of the articles to be picked up, since the robot controller 53 is configured to select the articles W with posture which matches the predetermined reference posture from the article position information prior to the other articles, a time period required for the operation for picking up the articles W by the robot arms 52 can be shortened.

An article transfer apparatus in accordance with a second embodiment of this invention is described below with reference to the drawings.

Figure 6:
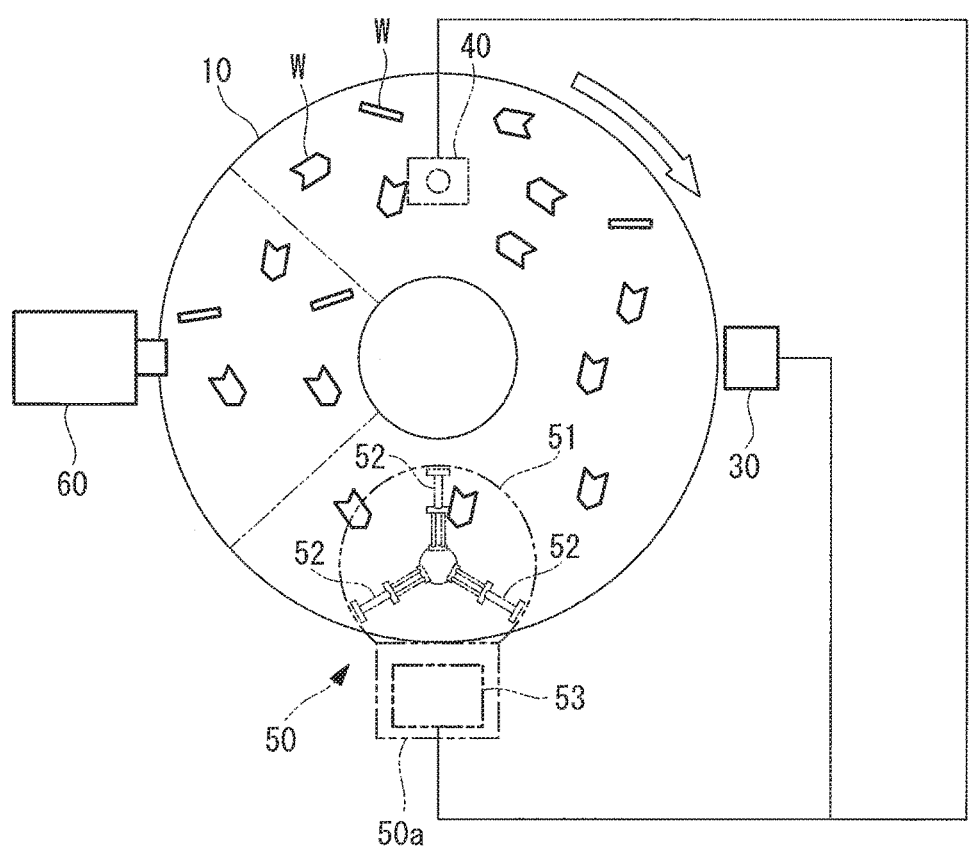
FIG. 6 is a plan view showing a schematic configuration of an article transfer apparatus according to a second embodiment of the present invention.
Figure 7:
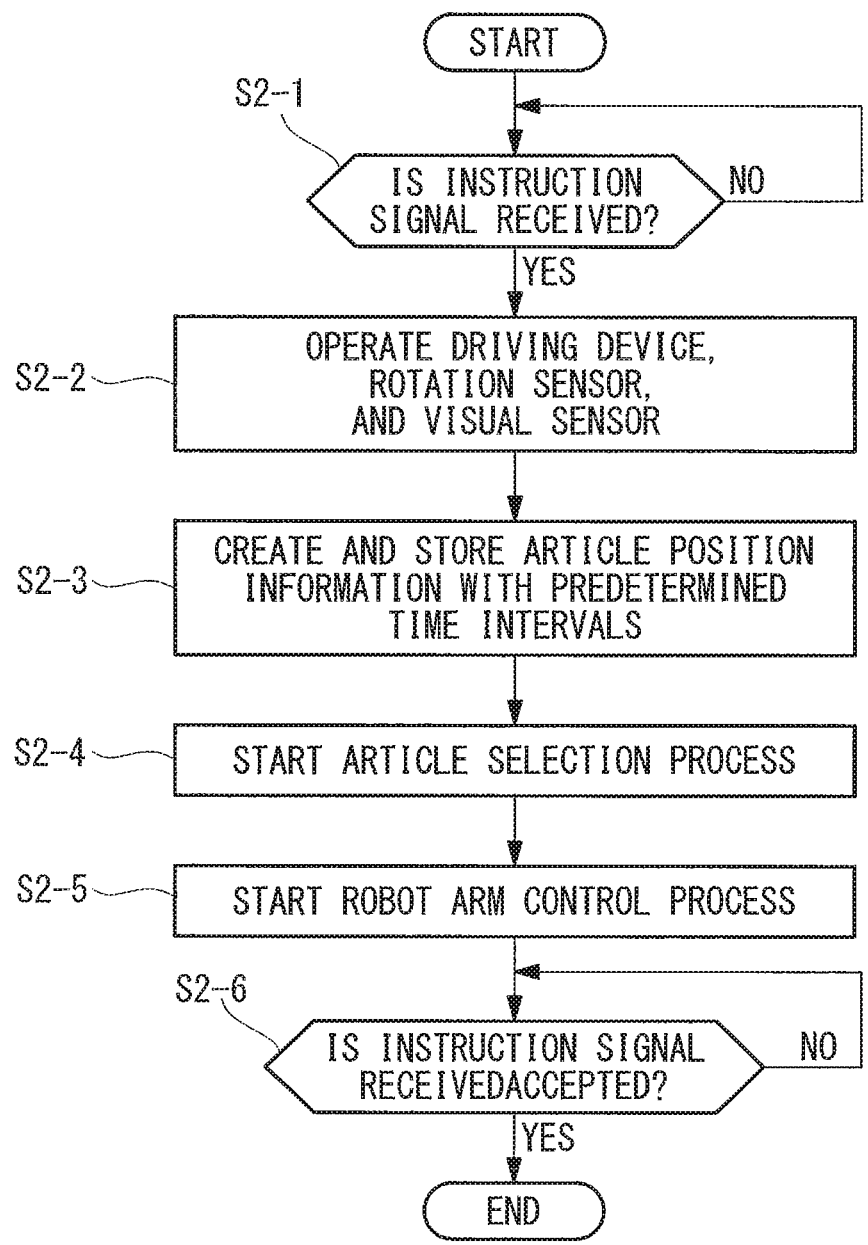
FIG. 7 is a flow chart showing control of the robot controller of the article transfer apparatus according to the second embodiment.

As shown in FIG. 6, this embodiment is to provide an air blowing apparatus 60 at a predetermined circumferential position of the rotating disk member 10 instead of the article supply apparatus 20 in the first embodiment. An example of operations of the robot controller 53 with this configuration is described below with reference to a flow chart shown in FIG. 7.

First, the plurality of articles W are supplied to the disk member 10 by an operator or a robot, and the plurality of articles W are placed on the click member 10. In this state, for example, when the operator inputs, by a predetermined input device, an instruction for starting the transfer of the articles W by the robot 50, and once this instruction is received by the robot controller 53 (step S2-1), the driving device 11, the rotation sensor 30, and the visual sensor 40 are started to operate (step S2-2). At this time, the articles W may be supplied, for example, to a predetermined position of the disk member 10 in the circumferential direction by the operator or the robot on a regular basis.

Next, in a manner similar to or the same as step S1-3 of the first embodiment, images of the articles W on the disk member 10 by the visual sensor 40 with predetermined time intervals, or every time the articles W move for a predetermined distance are captured, the processed images from the processor 42 with the predetermined time intervals, or every time the articles W move for the predetermined distance are received, and information which corresponds to the current detected result of the rotation sensor 30 is stored in the memory device 54 (step S2-3). And, in a manner similar to or the same as step S1-4 of the first embodiment, with the processed images of the respective article position information which are stored with the predetermined time intervals or every time the articles W move for the predetermined distance, an article selection process which selects the articles at positions located on the disk member 10, which are capable of being picked up by the robot arms 52, is started (step S2-4).

Continuously, in a manner similar to or the same as step S1-5, a robot arm control process which controls the plurality of servo motors respectively for operating the robot arms 52 is started based on the selection result of step S2-4, processed images of the article position information, and the detected result of the rotation sensor 30 when conducting the pick-up operation which is to conduct an actual pick-up operation by the robot arms 52 (step S2-5).

Next, when an operator inputs, by a predetermined input device, an instruction for ending the transfer of the articles W by the robot 50, and once the instruction is received by the robot controller 53 (step S2-6), the robot controller 53 ends the processing.

While the robot controller 53 conducts the above processing, a position or posture of each of the articles W on the disk member 10 are changed by the air blowing apparatus 60 at the predetermined circumferential position on the rotating disk member 10. Due to this, as well as the first embodiment, in this embodiment, the articles W which are moved to the downstream side without being picked up can be picked up after changing the position and the posture of each of the articles W by the air blowing apparatus 60. Therefore, this embodiment is also as effective as the first embodiment.

Figure 8:
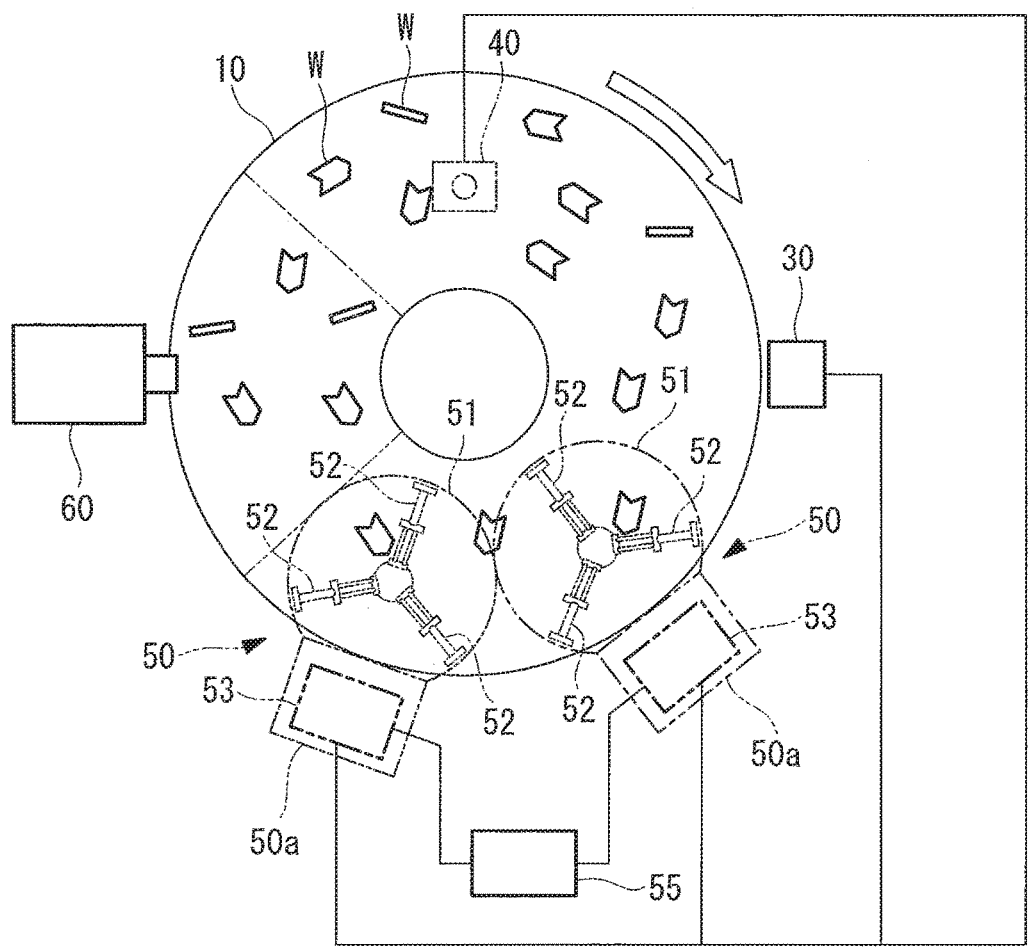
FIG. 8 is a plan view showing a schematic configuration of an article transfer apparatus according to a modified example of the second embodiment.

Moreover, in the first and the second embodiments, it is also possible to provide two robots 50 instead of providing one robot 50. For example, as shown in FIG. 8, in the second embodiment, it is also possible to operate the two robots together by providing an upstream side robot 50 and a downstream side robot 50 and by connecting the controllers 53 of the two robots 50 with each other by a hub 55.

In addition, step S1-4 or step S2-4 is conducted in the first and second embodiments, however, instead of conducting steps S1-4 and S2-4, in steps S1-5 and S2-5, the plurality of servo motors for operating the robot arms 52 may be controlled respectively based on the processed images of the article position information, and the detected result of the rotation sensor 30 when conducting the pick-up operation which is to conduct an actual pick-up operation by the robot arms 52. Even in such case, the position and the posture of each of the articles W which are moved to the downstream side without being picked up are changed by the air blowing apparatus 60, and a position and posture of each of the articles W are detected by the sensor 40, and such articles W enter the pick-up area of the robot arms 52 again.

On the other hand, in step S1-4 or step S2-4, a pick-up order of the articles W is decided, and in accordance with this order, the articles W can be picked up by the robot arms 52. Thus, a time period required for the pick-up operation of the articles W can be much shortened.

Note that, in the first embodiment and the second embodiments, the two-dimensional imaging device 41 is used for the visual sensor 40, however, a three-dimensional imaging device 41 may also be used. Furthermore, the robot arms 52 may be configured so that the robot arms 52 can pick up inclined articles W, and the robot arms 52 may also be configured so that the robot arms 52 can pick up inclined articles W based on information obtained by the visual sensor 40 by using the three-dimensional imaging device 41.

Moreover, in the first and second embodiments, the disk member 10 is used as the circulation conveyer, however, instead of using the disk member 10, a transfer device which has a plurality of plate-like members or stick-like members arranged along a predetermined circular-arc track, and the plurality of plate-like members or stick-like members rotate along the circular-arc track may be used so as to place the plurality of articles W on the transfer device. This is also as effective as the above description.

And, in the first embodiment, the article collecting member 24 is provided in order to house the articles W on the disk member in the container 21, however, instead of using the article collecting member 24, the articles W which pass through the pick-up area of the robot arms 52 can also be housed in the container 21 by using a dropping means which drops the articles W on the disk member 10 to a predetermined container, and by using an article collecting device which has an article transfer means for transferring the articles housed in the predetermined container to the container 21, or the like.

Also, in the first embodiment, the article supply member 23 is provided in order to supply the articles W on the disk member 10, however, as long as the articles W which are transferred to the upper end of the article feeding passage 21c can be dropped on the disk member 10, other members or devices which have different shapes or configurations can be used.

Moreover, in the first and second embodiments, the article supply apparatus 20 or the air blowing apparatus 60 are used in order to change the position or the posture of each article W on the disk member, however, instead of the article supply apparatus 20 or the air blowing apparatus 60, other members or devices which can change the position or the posture of each article W on the disk member can also be used. For example, it may be configured that a plurality of stick-like members which are arranged on the disk member 10 at an interval in the radial direction are provided instead of the air blowing apparatus 60, and that the position or the posture of each articles W can be changed by the stick-like members coming in contact with the articles W on the disk member 10.

REFERENCE SIGNS LIST

The aforementioned embodiments are included in the following aspects of the present invention.

An article transfer apparatus according to a first aspect of the present invention comprises a circulation conveyer which rotates along a predetermined circular-arc track in a state in which a plurality of articles are placed thereon; an article position change means which changes at least positions of the respective articles on the circulation conveyer at a predetermined circumferential position of the rotating circulation conveyer; a rotational position detecting means which detects a rotational position of the circulation conveyer; a sensor which obtains information that enables identification of at least positions of the respective articles on the circulation conveyer at a position after passing through the predetermined position in the circumferential direction; and an article pick up means which picks up the articles placed on the circulation conveyer in a state in which the circulation conveyer is rotating and which transfers the picked-up articles to a predetermined transferred position by using article position information in which the information obtained by the sensor corresponds to a detected result of the rotational position detecting means at the time of obtaining the information by the sensor, and a detected result of the rotational position detecting means at the time of picking up the articles.

With this aspect, since the plurality of articles are placed on the rotating circulation conveyer, positions of the articles are changed at the predetermined circumferential position, information which enables identification of positions of the articles after positions thereof are changed can be obtained by the sensor, and the articles on the circulation conveyer are picked up by the article pick up means by using the information, by repeatedly rotating the circulation conveyer and changing positions of the articles, every article will be placed at their suitable positions for being picked up by the article pick up means.

Due to this, it is unnecessary to pick up every article sent to a pick-up range of the article pick up means by the circulation conveyer, and therefore, the articles can be picked up sequentially from the articles which are easy to be picked up. Also, the articles W which are transferred to the downstream side without being picked up can be picked up after the positions thereof are changed by the article position change means. Therefore, it is not required to provide another article pick up means in order to pick up the articles which are transferred to the downstream side without being picked up.

Since the articles can be picked up sequentially from the articles which are easy to be picked up, it is not necessary to provide an article pick up means with a complex structure in order to pick up the articles with bad pick-up conditions, such as the articles placed at positions which are difficult for the article pick up means to pick up, and the like. Also, it is unnecessary to obtain exact position information or the like of the respective articles by a sensor in order to pick up the articles with the bad pick-up conditions by using the article pick up means with the complex structure, which can reduce costs for the sensor.

In the aforementioned aspect, it is preferable that positions of the articles, on the circulation conveyer, which are not picked up by the article pick up means are changed by the article position change means at the predetermined circumferential position.

With this configuration, when the articles are not picked up by the article pick up means since the articles are placed at positions which are difficult for the article pick up means to pick up, the positions of the articles will be changed by the article position change means, information which enables identification of positions of the articles will be obtained again by the sensor, and the articles on the circulation conveyer will be picked up by the article pick up means by using this information, therefore, it is unnecessary to pick up the articles with the bad conditions, such as the articles placed at positions which are difficult for the article pick up means to pick up, and the like.

In the aforementioned aspect, it is preferable that the article pick up means includes a robot arm for picking up the articles placed on the circulation conveyer, and a controller which executes an article selection process which selects articles to be picked up by the article pick up means based on the article position information, and a robot arm control process which controls the robot arm so as to pick up the articles selected by the article selection process.

With this configuration, since the articles to be picked up by the robot arm are selected by the article selection process, an operation for picking up the articles with the bad conditions, such as the articles placed at positions which are difficult for the article pick up means to pick up, and the like, can be reduced or eliminated.

In the aforementioned aspect, it is preferable that the information obtained by the sensor enables identification of a position or posture of each article on the circulation conveyer, and the controller is configured to select articles each having posture which matches a predetermined reference posture, prior to the other articles, using the article position information in the article selection process.

With this configuration, since the articles with the posture which matches with the reference posture are selected prior to the other articles, it is advantageous for shortening a time period necessary for operation for picking up the articles by the robot arms.

Advantageous Effects of Invention

According to the aforementioned aspects, it is possible to reduce manufacturing costs and improve transfer efficiency.
10 disk member
11 driving device
20 article supply apparatus
21 container
22 vibration imparting device
23 article feeding member
24 article collecting member
30 rotation sensor
40 visual sensor
41 imaging device
42 processor
50 robot
51 robot body
52 robot arms
53 robot controller
54 memory device
60 air blowing apparatus

The invention claimed is:

1. An articles transfer device comprising:
a circulation conveyer which rotates along a predetermined circular-arc track in a state in which a plurality of articles are placed thereon;
an article position change apparatus or member which changes at least positions of the respective articles on the circulation conveyer at a predetermined circumferential position of the rotating circulation conveyer;
a rotational position detecting device which detects a rotational position of the circulation conveyer;
a sensor which obtains information that enables identification of at least positions of the respective articles on the circulation conveyer at a position after passing through the predetermined position in the circumferential direction; and
an article pick up device which picks up the articles placed on the circulation conveyer in a state in which the circulation conveyer is rotating and which transfers the picked-up articles to a predetermined transferred position by using article position information in which the information obtained by the sensor corresponds to a detected result of the rotational position detecting device at the time of obtaining the information by the sensor, and a detected result of the rotational position detecting device at the time of picking up the articles.

2. The article transfer apparatus according to claim 1, wherein positions of the articles, on the circulation conveyer, which are not picked up by the article pick up device are changed by the article position change apparatus or member at the predetermined circumferential position.

3. The article transfer apparatus according to claim 1, wherein the article pick up device includes a robot arm for picking up the articles placed on the circulation conveyer, and a controller which executes an article selection process which selects articles to be picked up by the article pick up device based on the article position information, and a robot arm control process which controls the robot arm so as to pick up the articles selected by the article selection process.

4. The article transfer apparatus according to claim 3, wherein the information obtained by the sensor enables identification of a position or posture of each article on the circulation conveyer, and the controller is configured to select articles each having posture which matches a predetermined reference posture, prior to the other articles, using the article position information in the article selection process.

* * * * *